Aug. 16, 1960 W. S. GUBELMANN 2,949,229

REGISTER CLEARING MECHANISM

Original Filed Nov. 6, 1950

5 Sheets-Sheet 1

INVENTOR

William S. Gubelmann

REGISTER CLEARING MECHANISM

Original Filed Nov. 6, 1950 5 Sheets-Sheet 2

INVENTOR

William S. Gubelmann

INVENTOR

William S. Gubelmann

Aug. 16, 1960 W. S. GUBELMANN 2,949,229

REGISTER CLEARING MECHANISM

Original Filed Nov. 6, 1950 5 Sheets-Sheet 4

INVENTOR

William S. Gubelmann

INVENTOR

William S. Gubelmann

United States Patent Office 2,949,229 Patented Aug. 16, 1960

2,949,229

REGISTER CLEARING MECHANISM

William S. Gubelmann, Convent, N.J., assignor to Realty and Industrial Corporation, Convent, N.J., a corporation of New Jersey Original application Nov. 6, 1950, Ser. No. 194,273. Divided and this application May 16, 1955, Ser. No. 508,440

15 Claims. (Cl. 235—144)

This invention relates to calculating machines or the like.

The present application is a division of my co-pending case, Serial No. 194,273, filed November 6, 1950, for a Calculating Machine.

The instant invention is illustratively embodied in a calculating machine that has several registers in an ordinally shiftable carriage, and relates to means for clearing such registers. It is to be understood, however, that the invention may equally well be applied to other types of machines emboding one or more registers in an ordinally (step-by-step) shiftable carriage, or in a stationary portion of such machines.

A primary object of this invention is to provide a combination with a register operable to obtain different indications, of a clearing device alterable from one to another of two states and vice versa, the first state being that in which it is responsive to initiatory control and is then subject to automation for passing from the first state to the second state, during which passage its clearance function is exercised upon the register, the second state being that in which the clearing device is unresponsive to initiatory control, and drive mechanism having the dual function of operating the register and of transferring the device from its second state to its first state.

Another object is to provide improved means for selectively clearing registers. Where at least two registers are provided, the initiatory controls or keys are preferably individual to each register, but the controls are so clustered as to enable either simultaneous or individual operation thereof, as desired, with the highest degree of facility.

A further object is to provide a clearing mechanism which is responsive to a single momentary operation of an initiatory control for obtaining one complete register-clearing cycle of operation, but which will thereafter remain unresponsive to operation of the initiatory control until a registering operation is again performed by the machine.

Another object is to provide a clearing mechanism, as set forth above, with means operated by the machine's common motivating mechanism, during each registering operation of the machine, for rendering the clearing mechanism, when it is unresponsive immediately following a clearing operation, responsive again to operation of the initiatory control, and for preventing response of the clearing mechanism during registering operation, whereby a clearing operation cannot occur while a registering operation is being performed even though initiation were attempted at such times.

Still another object is to provide in a machine a register-clearing mechanism and an actuating means coupled therewith for operating the mechanism, which means is disposed so as to uncouple from the mechanism when the clearing operation is completed thereby and to remain uncoupled therefrom until the first subsequent registering operation is performed by the machine, thereby to prevent repetitive operations of the register clearing mechanism.

A further object is to provide a register-clearing mechanism and an actuating means, as set forth above, together with means operated by the machine's common motivating mechanism for re-coupling the actuating means with the clearing mechanism while a registering operation is being performed, and for preventing operation of such coupled mechanism and actuating means during any registering operation of the machine.

A still further object is to provide an actuating means which is automotive for its forward stroke, independently of the machine's common motivating mechanism, and is responsive to momentary operation of an initiatory control therefor, but which actuating means is operated for its return stroke by the motivating mechanism only during the first subsequent registering operation of the machine, and a register-clearing mechanism arranged so as to be coupled with the actuating means during the forward stroke thereof, but to uncouple therefrom at the completion of that forward stroke. The actuating means then, as set forth, remains at the completed forward stroke position until it is returned during the first subsequent registering operation, thereby more than one operation of the clearing mechanism by the actuating means, or more than one operation of the actuating means in response to either a prolonged or repetitive operation of the initiatory control for clearing a registration, after that register has been cleared, is not possible.

Once more, it is an object to provide a simple triggerable register-clearing mechanism, one that is spring powered, for example, such that upon performing one clearing operation it is not responsive to further triggering until it is "re-cocked" during the first subsequent registering operation of the machine, but which cannot be effectively triggered in any manner during that or any other registering operation.

Still further objects and advantages will be brought out in this disclosure, among which may here be mentioned the provision of a feature which enables a clearing operation to be performed on a carriage register simultaneously with the execution of a carriage shift. Another feature has to do with the provision of initiatory control locking means which prevents the starting of a clearance operation while a registration cycling initiatory control is in operated position and which also prevents operaton of such a control while a register clearance initiatory control is depressed. Certain safeguards against improper or inadvertent operation of the clearing means are also provided.

A characteristic of the clearing mechanism which is worthy of particular note is that when an operator wants to clear a given register in the carriage, he does so by momentary depression of an appropriate clear-key and does not have to hold the key down while the clearing operation completes its cycle. The triggering function of the clear-key starts the cycle and it becomes automatic thereafter, independent of the length of time the clear-key is held down. Also, the clearance operation will progress undisturbed by shifting of the carriage at such times.

The foregoing and other objects and advantages of the invention will be more readily understood upon reference to the ensuing disclosure. It will be apparent, however, that those skilled in the art will be enabled to apply the teachings of this disclosure to various modifications as intended to be covered by the scope of the appended claims. The description is directed to an exemplary embodiment of the invention illustrated in the accompanying drawings in which:

*General description*

Figures 1, 2, 3:
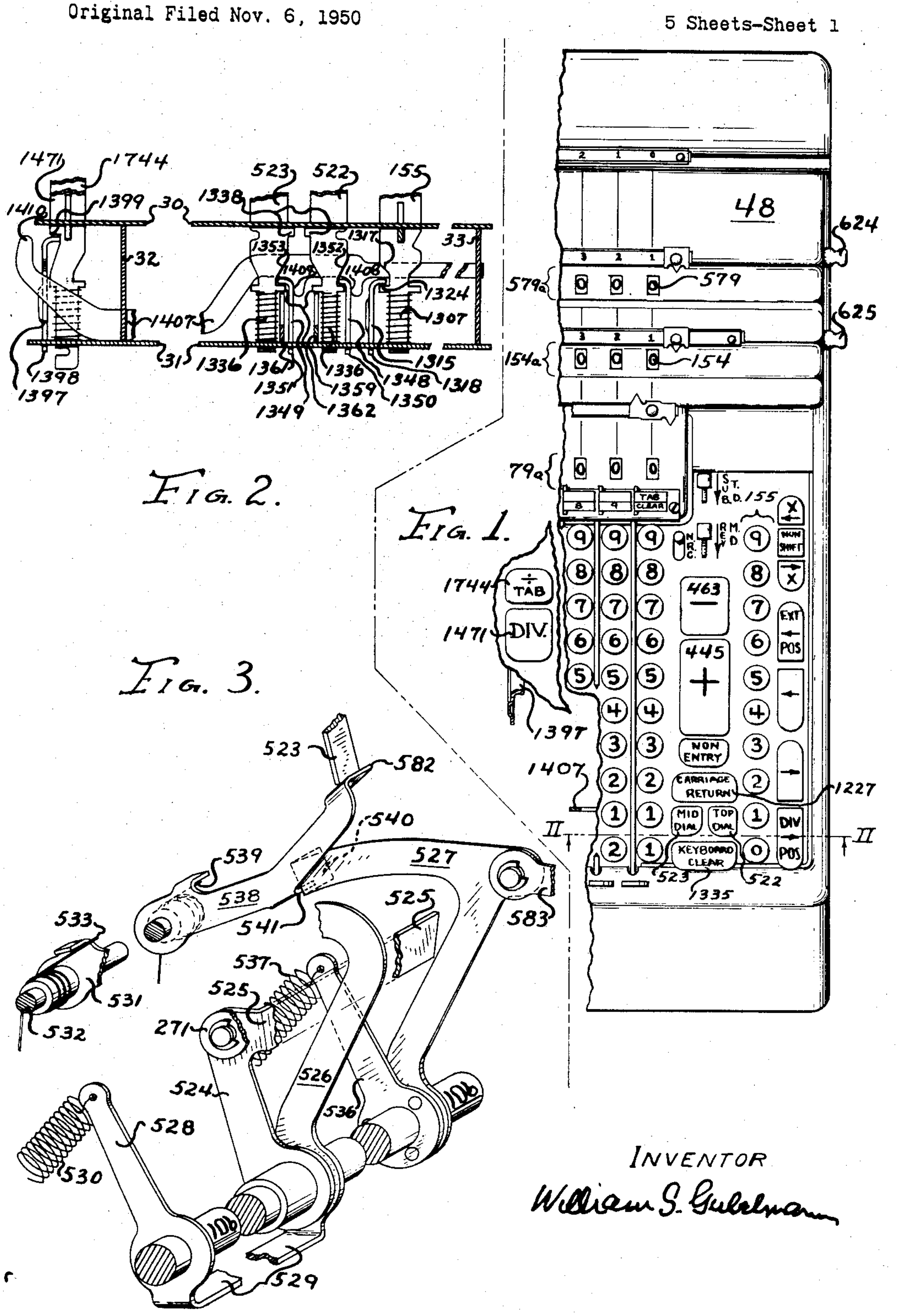
Figure 1 is a fragmentary view of the machine which embodies the invention.
Figure 2 is a condensed fragmentary sectional view showing register clearing and registration initiatory controls and the inter-lock therefor, as taken on line V—V, Fig. 1.
Figure 3 is a fragmentary right rear perspective of the clearance actuating means.

Since the machine in which the present invention is embodied is disclosed in detail in the aforementioned application, only a cursory mention thereof will be made herein, and for the sake of brevity only that mechanism which embodies the present invention or cooperates therewith will be described with more particularity.

The machine (Fig. 1) is a "four-rules calculator" embodying partial product and predetermined quotient devices. It performs the arithmetical calculations of addition, subtraction, multiplication and division automatically. Multiplication is direct, as distinguished from repeat addition. The multiplying or computing mechanism includes means for setting up partial products and for integrating them. Addition and subtraction calculations are performed by automatically treating the factors thereof as multiplicands and multiplying the factors by "1." The product thus obtained of a subtrahend is, of course, registered subtractively. Division is also direct. The mechanism used for a calculation in division includes means for deriving trial quotient digits and also makes use of the multiplying mechanism. This means that when a dividend has been set up in one of the registers and a divisor has been set up in the keyboard, the machine automatically selects a trial quotient digit and causes the multiplying mechanism to obtain the product of the divisor times the trial digit. The product is then subtractively registered in the dividend register. Since the trial quotient is derived from a comparison between the two highest orders of the dividend, or dividend remainder, and the highest order of the divisor, the trial quotient first attempted may not be a true quotient integer. In that case the machine automatically reduces the trial quotient by "1" and makes one or more further attempts to obtain the true quotient. When the true quotient, a single digit, is so obtained, it is registered in a register which serves this purpose. Failures to obtain the true quotient are evidenced by an over-draft from the dividend, which is automatically cancelled out by adding back the amount over-subtracted, that is, the product of the divisor times the trial quotient which proved to be too large. In the majority of instances the trial quotient proves to be the true quotient. The need for repeating more than once the attempt to obtain the true quotient integer is relatively infrequent.

Results and factors of the various computations are indicated in the ordinally disposed dials of registers 579*a*, 154*a* and 79*a* as follows: Register 579*a* indicates the multiplier, quotient and the number of items in addition or subtraction, or the complement of any of the foregoing. Register 154*a* indicates the product, dividend, sum, difference, or such complements thereof as are desired. Register 79*a* shows for easy reading the current setup on the main field of digit keys. Each register comprises ordinally arranged independently rotatable dials, and registers 579*a* and 154*a* are embodied in an ordinally shiftable carriage 48.

Register operating mechanisms, operable differential extents under control of the computing mechanism, are provided for registers 579*a* and 154*a*. These register operating mechanisms are settable so as to operate the dials in operative relation therewith either additively or subtractively. The register operating mechanisms are, however, normally disengaged from the registers so as to permit shifting of the carriage, but are engaged automatically with the registers following initiation of a computation cycle of operations.

Manually initiated shifting or automatically instituted shifting of the carriage may occur only when the register operating mechanisms are not engaged with the registers 579*a* and 154*a*. Programmed engagement and disengagement of the register operating mechanisms and intervenient operation of the registers thereby, is effected by a single cycle actuating mechanism that operates in response to depression of either the addition key 445, subtraction key 463, or a multiplication key 155, and also subsequently to the depression of a division key 1471 or 1744.

A single bank of multiplier keys 155 are provided, of which each of the keys for values "1–9" exercises a control over the computation mechanism for setting up significant partial products and simultaneously serves as an initiatory control for effecting operation of the computing mechanism. The cycle of operations so initiated includes the function of automatically instituting operations for an ordinal shift of the carriage. The "0" value key 155 serves to initiate an ordinal shift of the carriage without first having to excite the computation mechanism. Add key 445 and subtract key 463 are in effect "1" value multiplier keys, but the cycles of operations instituted thereby do not include the automatic initiation of a shift operation. Two division keys 1471 and 1744 are provided, either of which serves to initiate a division computation cycle of operations, providing the machine is properly set up for such a computation. With key 1471, quotients to the ordinal capacity of the register therefor may be obtained, but with key 1744 and presetting of the novel tabulating mechanism, disclosed in the parent case, a predetermined number of quotient digits, less than capacity, may be obtained automatically.

The shanks of each of the foregoing computation cycling keys are slidably extended through the keyboard frame members 30 and 31 (Figs. 2 and 4) and are spring held in normal or up position. With the exception of the "0" key 155 (Fig. 1) which in effect is a shift key, each computation cycling key is locked down when it is depressed and is released automatically only when the cycle of operations initiated thereby is completed.

As disclosed in the above cited application and as will be described in detail herein, a clearing mechanism is provided for each register 579*a* and 154*a* for clearing a registration therefrom by resetting to their clear designations only those dials therein that currently are indicating some other designations. Such operation of either one or both of the clearing mechanisms, however, is possible only when the machine is not being cycled in the performance of a computation, i.e., a registration operation. It is further devised and arranged that upon one such operation of a clearing mechanism, a second operation thereof is not possible unless an interposed registering cycle of operations is performed. The clearing mechanism for register 154*a* and a similar mechanism for register 579*a* operate respectively in response to depression of key 523 and 522. These mechanisms and the parts cooperating therewith will now be described with more detail.

*Clearing keys and locks*

Referring to Fig. 2, the shanks of keys 522 and 523 are slidably extended through slots in keyboard frame members 30 and 31. Ears 1338 are provided on the shanks so as to abut frame 30, thereby to limit the upward or return strokes of the keys. The downward strokes are limited by ears 1362 of the shanks abutting the bottom of slots 1363 (Fig. 4) of members 1359 and 1361, which will be described later. Compression spring 1336 (Fig. 2), coiled about the narrowed depending extremity of each key and supported by frame 31, serves to hold the key in normal position. Depression of a key compresses its spring which then also serves to return the key to its normal position.

It will be noted in Fig. 1 that the register clearing keys are laterally adjacent to each other for easy simultaneous manipulation, and are situated in the same bank with the addition key 445 and subtraction key 463. Ear 1367 (Fig. 4) on the shanks of keys 445 and 463 extend laterally rightward in the machine to overlie the member 1359 which is adjacent to the shanks. Member 1359, supported by frame 31 and guided by slots in front and rear keyboard frame members 34 and 35, has member 1361 secured thereto toward its forward end, forming a furcation that extends forwardly and parallelly with 1359. Hence the movements to be described of member 1359 will also apply to 1361. The leads of a torsion type spring 1360 (partially illustrated in Fig. 4) which is supported by plate 35 to one side of member 1359, extend through openings 1359*a* of the member to opposingly embrace the plate 35 and the membrane between the openings. This spring serves to return member 1359 from an operated position to the normal centralized position. Member 1359 is situated adjacent the shanks of the computation keys and left adjacent the shank of key 522 (Fig. 2) while the member 1361 is disposed to situate right adjacent the shank of key 523.

Figure 4:
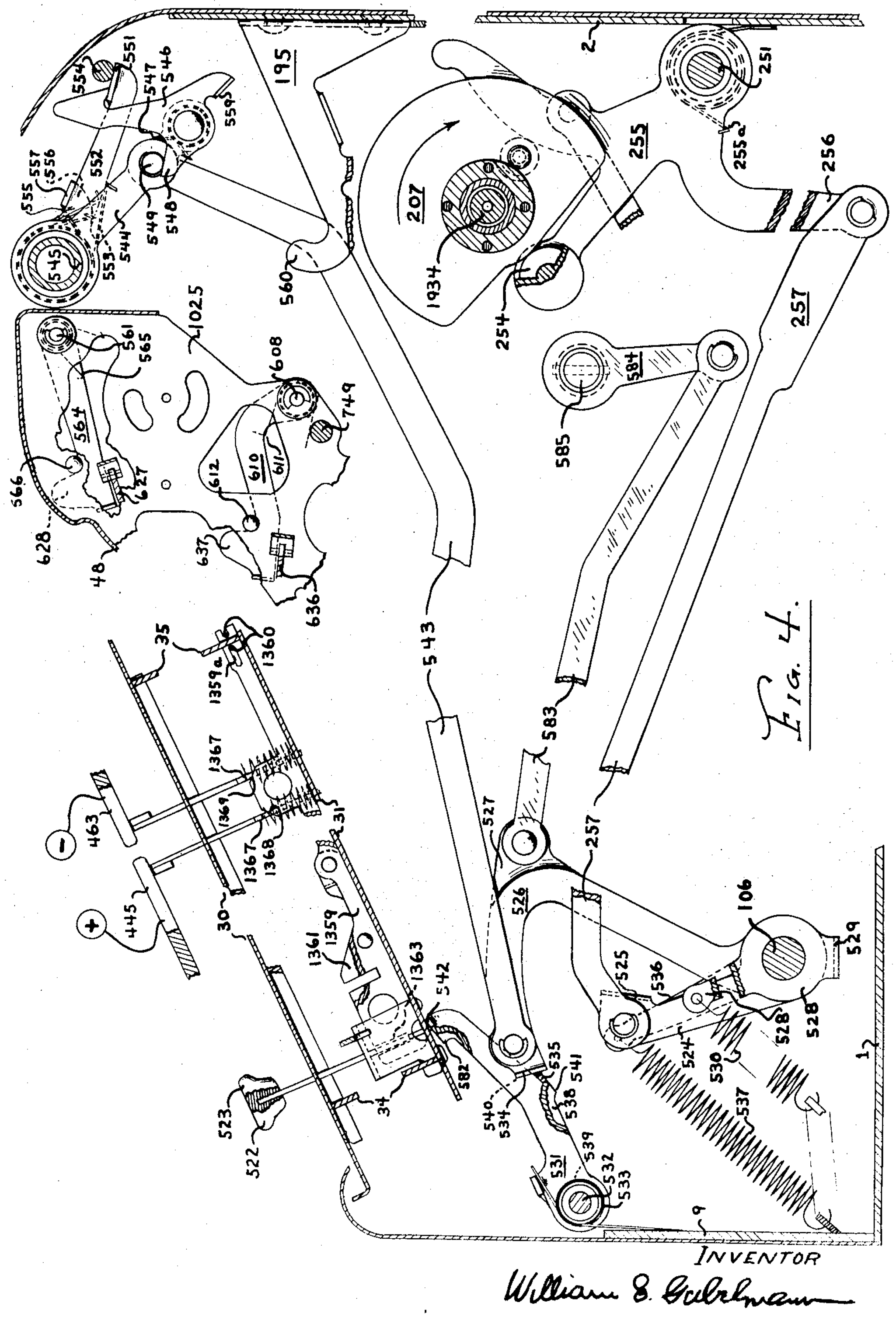
Figure 4 is a condensed fragmentary sectional right view illustrating registration and register clearing initiatory controls, an interlock therefor, the clearance actuating means, and part of the carriage-borne clearing mechanism, the latter as viewed from line N—N, Fig. 9.

Referring to Fig. 4, the upper face of member 1359 has an incline 1369 which lies in the path of the ear 1367 of the subtraction key shank, and an opposed incline 1368 which lies in the path of the ear 1367 of the addition key shank. Depression of key 445 moves the member 1359 rightward and depression of key 463 moves the member leftward by means of the respective inclines.

In normal position of members 1359 and 1361, the companion slots 1363 thereon are respectively in line with the ears 1362 (Fig. 2) of the clearing keys 522 and 523, thereby to permit depression of one or the other, or of both of the keys. Upon depression of a clearing key, the ear 1362 of its shank enters the respective slot 1363 (Fig. 4), whereby actuation of the member in either direction, leftward or rightward, is prevented. Therefore neither key 445 nor key 463 can be depressed sufficiently to initiate a registering cycle of operations while clearing key 522 or 523 is depressed. In either operated position of members 1359 and 1361, the companion slots 1363 are displaced with respect to the ears 1362, Fig. 2. Hence the upper faces of the slide members 1359 and 1361, are in the path of the ears 1362, thereby to prevent depression of the clearing keys. Therefore it is not possible to institute a clearing operation by either key 522 or 523 while the addition key 445 (Fig. 4) or subtraction key 463 is in depressed position. It can be understood then that the joined members 1359 and 1361, as an intra-bank means, are disposed to coact with a clearing and a registration cycling key upon depression of either of one of such keys so as to prevent depression of the other one of the keys.

The inter-bank means serving to prevent depression of a register-clearing key while a multiplication or division key is depressed, and, vice versa, to prevent depression of such computation cycling keys while a register-clearing key is depressed will now be described.

Referring to Fig. 2, the right edges of keys 522 and 523 are formed respectively with inclines 1352 and 1353. Vane 1348 and an identical vane 1349, each situated respectively to the right of the shanks of keys 522 and 523, are formed respectively with several ears 1350 and 1351 which extend through appropriate slots in plate 31 to serve as hinges for the vanes. The upper portion of these vanes are bent over to extend toward the respective key shank, at or about the origin of the incline thereon. The arrangement is such that when a clearing key is depressed, its incline rocks the adjacent vane clockwise and prevents the vane from being returned to vertical position while the key is depressed, and that when the vane is prevented from rocking clockwise that key cannot be depressed.

The shanks of multiplication cycling keys 155 are formed with inclines 1317 on their left edges. Vane 1315 is provided left adjacent to those edges and rightward of the vane 1348. Vane 1315 is formed with ears 1318 which depend through suitable slots in frame 31 to form a hinge for the vane. The upper portion of the vane is bent over to extend toward the key shanks, at or about the origin of the inclines. The arrangement is such that when a multiplication key is depressed its incline will rock the vane counter-clockwise and prevent the vane from being returned to vertical position while the key is depressed, and that when the vane is prevented from being rocked counter-clockwise none of the multiplication cycling keys can be depressed.

Vane 1397, situated to the left of the shanks of the division keys 1471 and 1744, is hinged by means of integral depending ears 1398 extended through slots in frame 31. The upper portion of this vane is also bent over to extend toward the keyshanks. In normal or vertical position of the vane, its bent-over portion contacts the left profile of the shanks and underlies the abutments 1399 formed thereon so as to prevent depression of either division key. When the machine is properly set up for a division computation or is in an analogous condition, as more fully described in the parent case, the vane is rocked counter-clockwise automatically sufficiently to clear the surface 1399, and is yieldably held in that position. At such times either division key may be depressed and the profile of the depressed key-shank, upward of the surface 1399, will prevent return of the vane to vertical position until the key is again returned to normal position. On the other hand, if neither key is depressed the yieldably held vane may be returned from canted to vertical position, thereby to prevent depression of either key even though the machine is in condition for initiating division cycling.

Bar 1407, slidably mounted in slots in plates 32 and 33, is a free sliding member operatable in one direction by vanes 1315 and 1397, and in the opposite direction by vanes 1348 and 1349 as will be explained. The leftward portion of the bar extends under and beyond the end extension of the vane 1397 so that the integral upturn 1410 is left adjacent to the vane. The upturn 1410 serves to prevent a rightward shift of the bar 1407 when the vane 1397 is in canted position and a divide key is depressed. When, however, a divide key is not depressed, upturn 1410 will return the vane to vertical or key locking position in response to a rightward movement of the bar. Also, when the vane 1397 is vertical and the bar is held in a rightward position, the upturn 1410 serves to prevent an otherwise possible counter-clockwise rotation of the vane. In other words, whenever a divide key is not depressed and a rightward movement of the bar 1407 is enforced, vane 1397 locks the divide keys against depression. Such rightward movement of bar 1407 occurs in response to depression of either clearing key as follows: The bar is formed with fingers 1408 and 1409 which depend respectively right adjacent the vane 1348 and vane 1349. These fingers are in the path of the clockwise swing of the respective vanes when the bar is in its leftward position as indicated. Hence such movement of either vane 1348 or 1349 in response to depression of the key associated therewith will slide the bar rightward and hold the bar in that position while the key is depressed.

It will be noted that the finger 1408 is interposed the vanes 1348 and 1315. The relationship between the fingers 1408 and 1409 and the vanes 1315, 1348 and 1349 is such that when either of the latter two vanes is rocked clockwise, the bar 1407 will be moved rightward, as described, and the finger 1408 will be held against the vane 1315 then in its vertical position, and that when vane 1315 is rocked counter-clockwise, the bar will be moved leftward by means of finger 1408 whereupon that finger and 1409 will be situated against the respective clearing key vanes. At times when a division key or a multiplication key is depressed, bar 1407 will be moved to the left and held in that position until the depressed key is returned. Hence neither vane 1348 nor 1349 can swing clockwise and, consequently, the clearing keys cannot be depressed. Conversely, if a clearing key is depressed, bar 1407 is held in its rightward position whereby neither vane 1315 nor 1397 can swing counter-clockwise and, consequently, a multiplication key or a division key cannot be depressed. Since the bar 1407 moves leftward in response to depression of a computation key and rightward in response to depression of a clearing key, simultaneous depression of a key of each type is not possible. It is to be understood then that the inter-bank lock is also disposed to coact with a clearing key and a registration cycling key upon depression of either one of such keys so as to prevent depression of the other one of the keys.

From the foregoing disclosure of the intra-bank and inter-bank locks it can be seen that no matter what bank-relationship exists between a registration cycling key and a clearing key, a locking means is disposed to coact with either one of such keys upon depression thereof so as to prevent initiatory depression of the other of the keys, whereby initiation of clearing and registration cycles of operations so as to occur concurrently cannot be effected.

*Clearance actuating means*

The clearance actuating mechanism (Fig. 4), the triggering thereof by depression of clearing keys 522 and 523, and the "recocking" of the triggered mechanism will now be described.

The depending extremity of the shank of key 522 overlies lateral lug 542 of detent 531 and, similarly, the shank of key 523 (Fig. 3) overlies the lateral lug 582 of detent 538. These corresponding detents are pivoted independently of each other on shaft 532 (Fig. 7) which is supported on frame members 17 and 18. Referring again to Fig. 4, springs 533 and 539, fastened respectively to detents 531 and 538 and frame 9, serve to urge the detents counter-clockwise to their normal positions, as indicated, with the lugs 542 and 582 against the associated key shanks.

In the normal position of detent 531, lateral lug 535 thereon is in the path of lug 534 on spring-impelled member 526 for preventing counter-clockwise rotation of the member and for holding the member in "cocked" or normal position. Similarly, lateral lug 541 of detent 538 is in the path of lug 540 (Fig. 3) on spring-impelled member 527 for holding that member in cocked position.

Member 526 is formed as a bail 529 with integral arm 528 merely to circumvent other components of the machine and provide a suitable spring anchorage. Both the member proper and the arm are rotatably mounted on shaft 106 (Fig. 7) which is supported on frame members 5 and 7. Referring again to Fig. 3, member 527 has spring anchor-arm 536 fastened thereto, and the unit thus formed is also pivoted on the shaft 106. Suitably tensioned springs 530 and 537 are fastened respectively to the arms 528 and 536 and to frame 9 (Fig. 4) for rocking the respective members counter-clockwise upon triggering of the members. Such single stroke movements of the members, as will be described, actuates the clearing mechanisms connected therewith for a complete clearing cycle of operations.

Depression of a clearing key triggers the associated actuating means by rocking the related detent clockwise sufficiently to clear the detaining lug from the member lug, as for example, detaining lug 535 from member lug 534. The relationship between a detaining lug and a member lug cooperating therewith is such that the detaining lug will swing clear of the member lug only when the respective clearing key has been depressed sufficiently to render effective the afore described locking means. Both members 526 and 527 are so devised that the lug carrying portion of each will pass over the respective detaining lug to hold the detaining lug in rocked position when triggering of that member occurs. Hence the key rocked detent is retained in operated position until the triggered member is returned sufficiently to permit the detent to return to latching position, thereby to hold that member in cocked position again.

A lateral extension 525 is formed on lever 524 which is pivoted on the shaft 106, Fig. 3. The extension extends leftward in the machine to situate in the path of the counter-clockwise or forward swing of member 526 and 527. Normally lever 524 is held in end-stroke position of the members for arresting them when they are triggered, but during a registering operation it is oscillated, as will now be described, whereby extension 525 also serves to "recock" the members, if they have been triggered.

In the afore cited parent case several link members were utilized, as a course of expediency, for connecting the lever 524 (Fig. 4) with follower 255, but for the present disclosure such connections may be considered as consisting of a single link 257. One end of such a link 257 is pivotally connected to the lever 524 and the other end, rearward in the machine, is pivoted on the depending arm 256 of follower 255 which is fulcrumed on shaft 251 (Fig. 7) supported on frames 5 and 8. A torsion spring 255*a* (Fig. 4), fastened to follower 255 and to frame 2, serves to urge the follower clockwise so that the roller 254 mounted thereon rides the periphery of cam 207. In normal position of the cam, its minor radius periphery is presented to the roller 254. Hence the follower 255 is normally in its most clockwise position and, consequently, the lever 524 is held in its counter-clockwise position, the afore explained end-stroke position.

Cam 207 is an integral part of the single revolution common motivating mechanism or unit to which reference may be had in the parent case. This unit, formed with several other cams (not shown) in addition to the cam 207, rotates clockwise on shaft 1934 in response to initiatory controls, as previously stated herein. During such rotation, the unit actuates the various components of the computing mechanism, and actuates the register operating means (controlled differentially by the computing mechanism) for the performance of registrations in registers 154*a* and 579*a*, Fig. 1. Accordingly, the only time a registration will occur in either register 154*a* or 579*a* is when the motivating unit makes a revolution of 360°. Hence the cam 207 (Fig. 4) makes no more than one complete revolution each time a registration is performed. The configuration of cam 207 is such that it rocks the follower counter-clockwise in the early stages of its revolution before registration begins, it holds the follower in that position until the latter portion of the revolution and finally, when the registrations are completed, it permits the follower to be returned clockwise to normal position again.

Consequently, lever 524 is rocked clockwise for returning possibly triggered member or members 526 and 527, to cocked position again only once in each cycle of registry operations. Also, the lever 524 is always held in the recocking position until the current registering operations are completed, then it is returned to its end-stroke position. In this manner lever 524 serves to prevent effective triggering of either 526 or 527 during any registering operation, if such triggering were possible during registering operations.

From the foregoing it can be readily understood that the actuating means provided for operating the register clearing mechanism is responsive to single momentary operation of the initiatory key therefor, and that thereafter the actuating means remains unresponsive to further or repetitive operation of the control until the first subsequent registering operation is performed by the machine. It can be understood that the motivating means renders the clearance actuating means responsive during a registering operation, but prevents response of a clearing actuating means during any registering operation.

Figure 5:
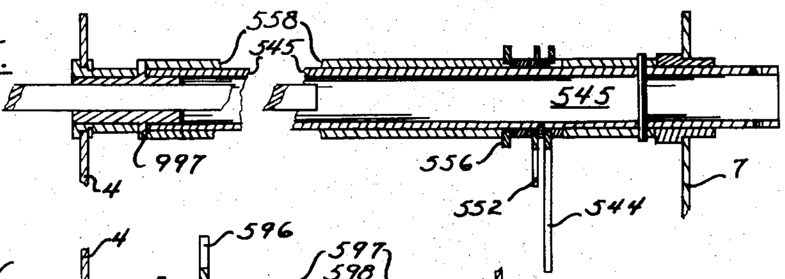
Figure 5 is a condensed sectional view of means for transmitting rotative motion to a clearing mechanism in the carriage.
Figure 8:
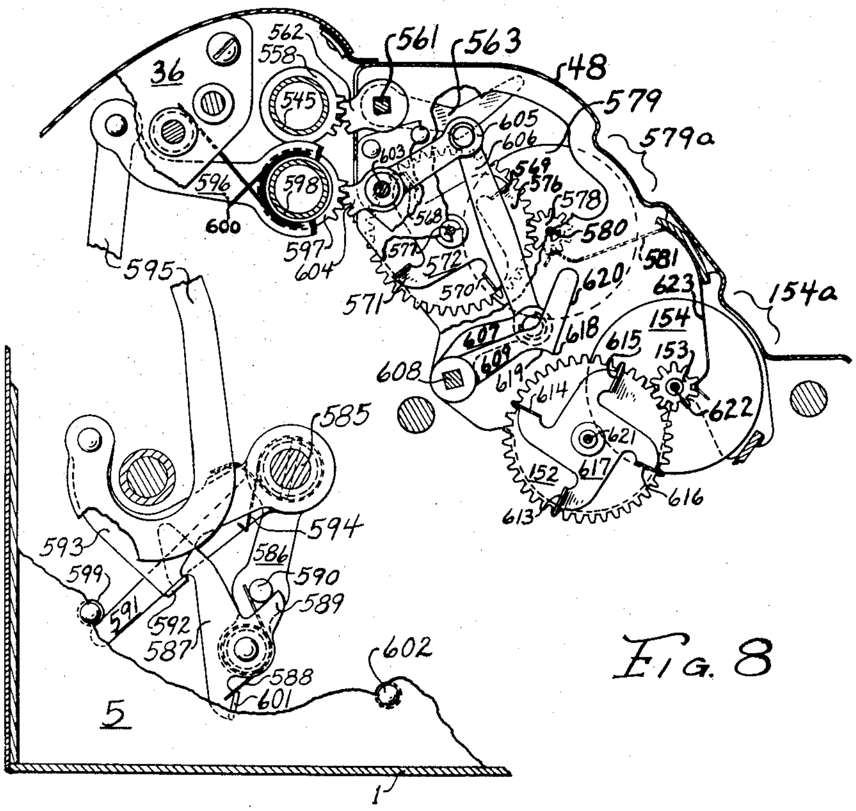
Figure 8 is a fragmentary left sectional view of the carriage, illustrating the dials and associated clearing mechanism components as viewed from line K—K, Fig. 9, and parts of the means for transmitting rotative motion to the carriage-borne clearing mechanisms.

The movement obtained from the forward stroke of member 526 is transmitted to the carriage-borne clearing mechanism for register 579*a* (Fig. 1) by the following means:

A wire gear 558 (Fig. 8) is rotatably mounted on tubular shaft 545. This shaft is supported on frame members 4 and 7, Fig. 5. The wire gear is of sufficient length to permit meshing therewith of a carriage-borne gear segment 562 (Fig. 8) in any position of the carriage. Segment 562 is a part of the clearing mechanism which will be described later. Referring again to Fig. 5, a lever 556 is secured to the right end of wire gear 558 and at spaced points rightward therefrom levers 552 and 544 are pivotally mounted on shaft 545. Lever 556 (Fig. 4) is provided with lateral extension 557 which overlies the lever 552. A torsion spring 555 is fastened to the levers 556 and 552 for yieldingly holding together lever 552 and extension 557. The spring 555 is of such tension that when the lever 552 is rocked clockwise, lever 556 and the attached wire gear will move therewith to cause a clearing operation, provided the clearing mechanism is not locked out, as against an inadvertently instituted operation. At times when such lock-out (to be described) is effected the lever 556 cannot rotate clockwise, but spring 555 will permit lever 552 to perform its stroke. A counter-clockwise or return stroke of lever 552 will, of course, rotate the lever 556 counter-clockwise by means of the extension 557.

Figure 7:
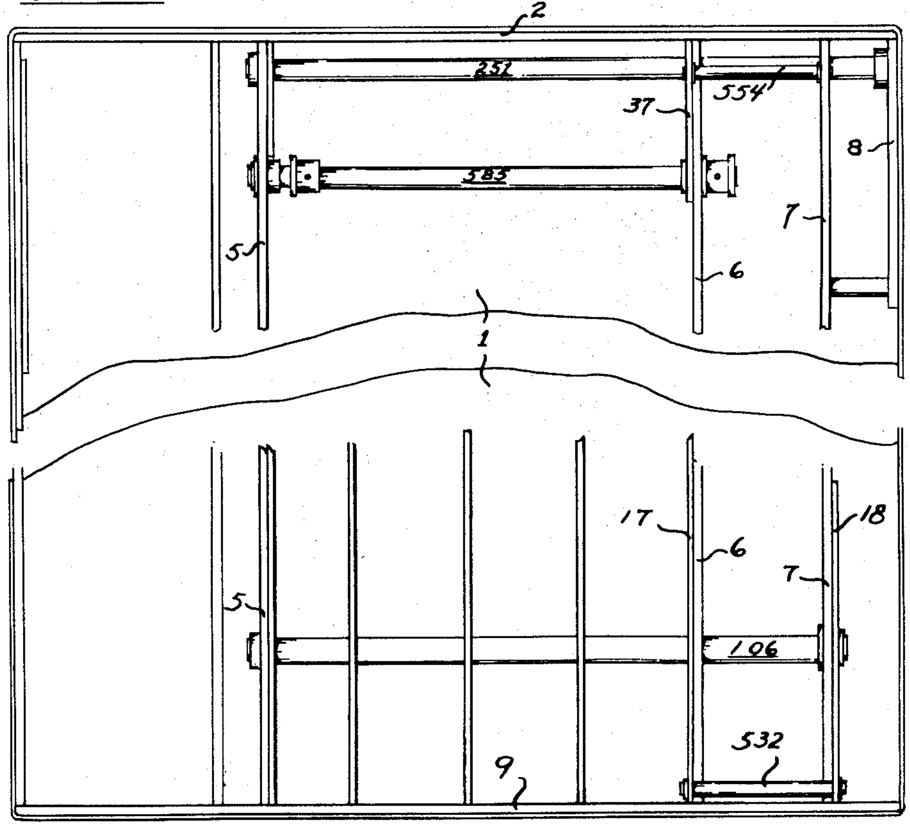
Figure 7 is a reduced fragmentary top plan of the machine's frame members and of some of the significant shafts supported thereby.

Normally the extremity of lever 552 is in contact with stop-rod 554 mounted on frame members 7 and 37, Fig. 7. This position of lever 552 (Fig. 4) corresponds with the normal positions of certain clearing mechanism components which, as will be described, are then free of the register so as not to interfere with the registering during a registry operation. A lateral lug 551 is provided on lever 552, and a latch 546, pivoted on lever 544, is normally coupled with the lug for swinging the lever 552 clockwise, when the lever 544 is so rocked. A torsion spring 547, mounted between the lever 544 and latch 546, and fastened to each, serves to urge the latch to latching position. At this position of the latch, integral finger 548 contacts stud 549 which is utilized as the pivotal connection for lever 544 and one end of link 543. The other end of the link 543 is pivotally connected to the actuating member 526. Accordingly, on its counter-clockwise forward stroke member 526 will rock the lever 544 and the lever 552 coupled therewith clockwise, thereby to cause a clearance operation. At about the time the clearing stroke is completed, latch 546 will be rocked counterclockwise to disengage it from lug 551. This is accomplished by an upright lug 560 on bracket 195 being in the path of lateral tab 559 on a depending portion of latch 546. The bracket 195 is secured to frame 2. It will be noted that a torsion spring 553 is fastened to levers 544 and 552 so as to urge the lever 544 clockwise and the lever 552 counter-clockwise. At about the time the levers are uncoupled from each other, member 526 is arrested and, consequently, the lever 544 is also stopped. Then the spring 553 will return lever 552 to normal position, whereupon the actuated clearing mechanism will also be returned, as will be described. Even though the clearance actuating means may remain in operated position indefinitely the just described coupling provision permits the actuated clearing mechanism to complete its cycle immediately. Recoupling of levers 544 and 552 is accomplished at the same time re-cocking of the actuating member 526 occurs. Member 526, as described, is returned clockwise. Hence the lever 544 is then rocked counter-clockwise and the latch 546, carried thereby, is disposed to oscillate upon contacting the lug 551, thereby to couple with the lug again.

The means for transmitting the movement obtained from the forward stroke of actuating member 527 to the carriage-borne clearing mechanism for register 154*a* (Fig. 1) is substantially the same as the just described train of couplings and linkage. The two trains are identical functionally, but they differ slightly structurally. The minor structural differences in the second train serve only to circumvent various components of the integrated mechanisms of the machine illustrated in the parent case. Accordingly, a brief tracing through the second train, will suffice.

One end of link 583 (Fig. 4) is pivotally connected to member 527 and the other end, rearwardly in the machine, is pivoted on lever 584 which is secured to the right end of shaft 585 (Fig. 7) journaled on frame members 6 and 5. Lever 586 (Fig. 8) is secured to the shaft 585 towards its left end. Levers 591 and 593 are pivotally mounted on shaft 585. Lever 593 is yieldingly held to lateral lug 592 on lever 591 by torsion spring 594 situated between the levers and secured thereto. In normal position lever 591 is in contact with stud 599 on frame 5. Spring-tensioned latch 587, pivotally mounted on lever 586, is normally coupled with the lug 592 on lever 591. The latch will uncouple from the lug when the lever 586 is rocked counter-clockwise by the forward stroke of the associated actuating member. At the latter part of this stroke, stud 602 which is disposed in the path of lateral lug 601 on the depending portion of the latch 587, causes the latch to rock clockwise thereby to disengage from the lug 592. Stud 602 is on frame 5. Spring 588, fastened to the latch 587 and lever 586, serves to rock the latch counter-clockwise to latching position whereat integral latch finger 589 contacts stud 590 on lever 586. The coupling and unlatching arrangements of this train have operational characteristics and functions that correspond with the coupling and unlatching arrangements of the previously described train for the mechanism that clears register 579*a*.

Figure 6:
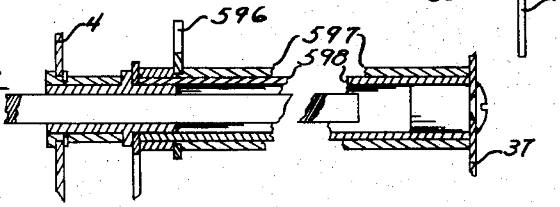
Figure 6 is a condensed sectional view of means for transmitting rotative motion to another clearing mechanism in the carriage.

One end of link 595 is pivoted on the lever 593 and the other end, upward therefrom, is pivotally connected to lever 596 which is secured to wire gear 597. This gear is rotatably mounted on tubular shaft 598 (Fig. 6) which is supported on frame members 4 and 37. Wire gear 597 provides for the meshing therewith of carriage-borne gear segment 604 (Fig. 8) in all positions of the carriage. Gear segment 604, as will be described, is part of the clearing mechanism for register 154*a*. The gear 597 is rotated counter-clockwise for operating the associated clearing mechanism to perform a clearing function. Spring 600, fastened to lever 596 and in any convenient manner to frame member 36, serves to return and hold the parts 597, 596, 595, 593, and 591 in their normal positions when the lever 591 is uncoupled. This train, as can be seen, is substantially a counter part of the first described train and provides the same features and advantages as the first train. To mention at least one, its uncoupling provision permits the actuated clearing mechanism to complete its cycle immediately, even though the return of the actuating means may be delayed indefinitely until a subsequent cycle of registration operations.

*Carriage-borne clearing mechanism*

Figure 9:
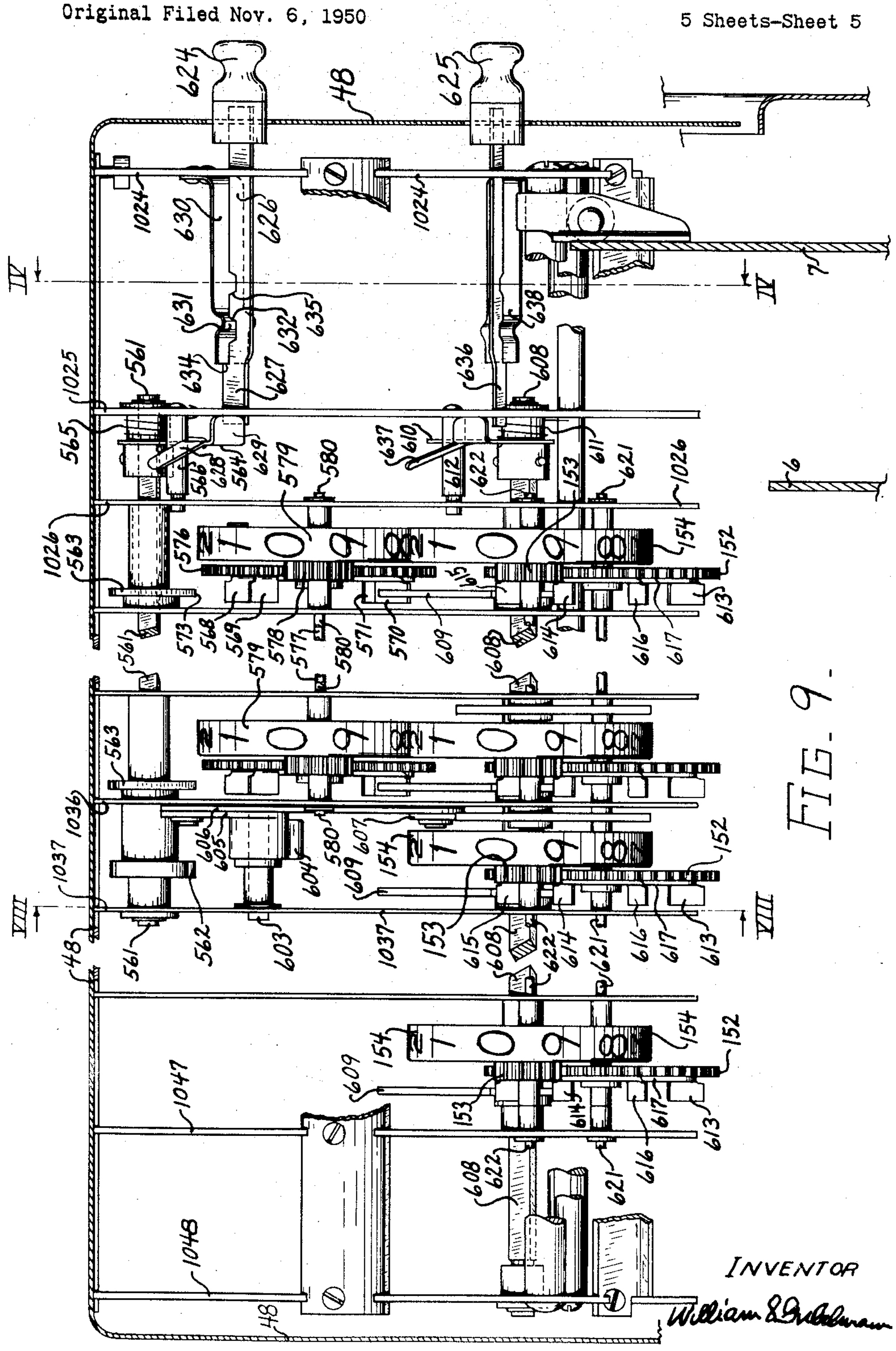
Figure 9 is an enlarged, condensed fragmentary front view of components in the carriage showing principally the dials, the associated gears and clearing mechanism components, and clearing locks.

Register 154*a* comprises ordinally arranged dials 154 (Fig. 9) which are rotatably mounted on shaft 622 that is supported on carriage frame members 1026—1047. A pinion gear 153, secured to each dial 154, is meshed with a gear 152 rotatably mounted on shaft 621 which is also supported on frames 1026—1047. The ratio between a gear 152 (Fig. 8) and a pinion gear 153 meshed therewith, is illustratively 4 to 1. Accordingly, the dial 154 rotates 360° for each 90° rotation of gear 152. Operation of a dial 154 for either a registration or a clearance is accomplished by rotation of associated gear 152. For a registration the gear 152 is operated directly by an engageable and disengageable register operating means which is not shown, but to which reference can be had in the parent case. For a clearance operation, the gear 152 is operated by actuation of a member 617 secured thereto. Member 617, one of which is secured to each gear 152, is formed with four lateral lugs 613–616 (Fig. 8) disposed radially at right angles to each other for defining the quadrants of the member's revolution with respect to corresponding revolutions of the related dial. For actuating the member 617, a clearing arm 609 is provided for each member. The ordinally spaced arms 609 are secured to the shaft 608 (Fig. 9) which is journaled at its ends on carriage frame members 1048 and 1025. The shaft may also be journaled for additional support on any of the interposed frame members, through which it extends. A lever 607 (Fig. 8) is also secured to shaft 608 has the depending end of link 606 pivotally connected thereto. The upper end of the link is pivotally joined to lever 605, whereby a clockwise movement of the lever will swing the unit formed of members 609 and parts 607 and 608 clockwise. Lever 605 integral with the aforementioned gear segment 604, meshed with the wire gear 597, is rotatably mounted on rod 603 (Fig. 9) supported by carriage frame members 1036 and 1037. It can be readily seen that the counter-clockwise movement of the gear 597 (Fig. 8) will rock the clearing arms clockwise, thereby to actuate the member 617, as will now be described. Since the sets of parts relative to each of the dials are alike, the following need be directed to only one such set of parts. The relationship between the arm 609 and member 617 is such that when the dial 154 stands at a designation other than "0," one of the lugs is always presented to the arm for the purpose of being actuated by the arm so as to rotate the members 617. In "0" or clear standing of the dial, the two successive ones of the lugs are always situated with respect to the arm at normal position as are the lugs identified as 614 and 615. In this instance, at the end of the arms clearing stroke its profile 620 will merely contact lug 615, and profile 619 will contact lug 614. Hence the arm 609 does not actuate the member 617 when the dial stands at "0." Only those dials that stand at other than "0" are operated to "clear."

If the dial stands at a number 1–5, one of the lugs will be situated in a corresponding position counterclockwise of the presently indicated "0" position occupied by lug 615 and clockwise of the point 618 on the arm formed by the junction of profiles 619 and 620. At such times, during the clockwise stroke of the arm, profile 620 will engage the significant lug to rotate the member 617 clockwise to "0" position. If the dial stands at a number 6–9, one of the lugs will situate in a corresponding position clockwise of the presently indicated "0" position occupied by lug 614 and counterclockwise of the point 618 on the arm. Accordingly, during the clearing stroke of the arm, profile 619 will engage the significant lug to rotate the member 617 counterclockwise to "0" position. Therefore a dial is never rotated more than generally half of a revolution when it is being cleared. By reducing the extent of operations of the various parts to an equivalence of no more than half of a revolution, substantial savings of wear and effort on the part of the mechanism are realized. At about the time arm 609 has rotated clockwise sufficiently to cause the dial to stand at "clear" the latch 587 (in the lower left of the Fig. 8) is uncoupled from the lever 591, as previously described, whereupon a portion of the train, up to and including wire gear 597, is returned to fixed normal position as limited by the stud 599. Simultaneously, the carriage-borne clearing mechanism is returned to its normal position by return spring 611, Fig. 4. This spring is fastened to frame 1025 in any convenient manner and to a lever 610 which is secured to the right end of shaft 608. The spring rotates the lever clockwise against stop stud 612 on the frame 1025 when the uncoupling occurs. With this fixed return position provided for the carriage-borne mechanism, and a corresponding, but independent, fixed position provided for the returned portion of the train, the friction between the meshed gears 597 (Fig. 8) and 604 is minimized, when the carriage is shifted.

Register 579*a* and the clearing mechanism therefor are substantially the same as the just described register 154*a* and its clearing mechanism. Therefore only the structure of the register 579*a* and its clearing mechanism will be pointed out.

Register 579*a* consists of ordinally arranged dials 579 (Fig. 9) mounted rotatably on shaft 580 which is supported on frames 1026—1036. A pinion gear 578 is secured to each dial 579 and is meshed with a gear 576 rotatably mounted on shaft 577 which is also supported by frames 1026—1036. The ratio between the gears 576 (Fig. 8) and 578 is also 4 to 1. Accordingly, the member 572 secured to each gear 578 is formed with lateral quadrant lugs 568—571. For each member 572 a clearing arm 563 is secured to shaft 561 (Fig. 9) which is journaled on frames 1025—1037. The aforementioned gear segment 562 (Fig. 8) which is meshed with the wire gear 558, and a lever 564 (Fig. 4) are secured to the shaft 561. The clearing unit or mechanism formed of parts 561, 564, 562 (Fig. 8), and arms 563 is urged to normal position by spring 565 (Fig. 4) fastened to the lever 564 and frame 1025. In normal position of this unit, lever 564 is against stop-stud 566 on the frame 1025, whereby the same minimization of friction is achieved for gears 558 (Fig. 8) and 562 while the carriage is shifted, as for previously described gears 597 and 604.

*Clearance lock-out*

Whenever it is desired to hold a particular factor or totals in either register 154*a* (Fig. 1) or 579*a*, lockout means are provided for selectively preventing inadvertent clearing of the registers. In order to effect lockout of the clearing mechanism for register 579*a*, knob 624 on the right end of the carriage is pushed in, and to free the clearing mechanism, the knob is pulled out. Knob 625 controls the clearing mechanism for register 154a in the same manner as knob 624 controls the clearing mechanism for register 579a.

Knob 624 (Fig. 9) is secured to a bar 626 that is slidably supported on carriage frame members 1024 and 1025. Free sliding of the bar is prevented by a crimped leaf-spring 630 secured to frame 1024. The spring presses against the bar which is notched at 632 and 635 to receive the crimp 631 when the bar is respectively in the out and in positions. Spring 630 yields whenever the knob is operated. Bar 626 is also formed with surface 634 which contacts the end of the spring 630 to limit the outward slide of the bar. The inward movement of the bar terminates when the left face of the knob strikes frame 1024.

At times when the clearing unit for dials 579 is in the afore-described normal position and bar 626 is moved leftward, end portion 627 of the bar will move in under lever 564 (Fig. 4) of the clearing unit, thereby to prevent the clearing stroke of the unit. Whenever the clearing mechanism is thus locked out and the associated clearance actuating means is triggered, the lever 552 yields clockwise with respect to the then arrested lever 556, as previously described.

Lever 564 is provided with an ear 628 so as to prevent the bar from moving in over the lever while the clearing unit is at a position other than normal. The lever, being of suitable flexible material, will, at such times, distort leftward (Fig. 9) in the machine, and upon completion of the clearing cycle the lever will snap rightward over the bar. The end portion 629 of the lever 564 is bent over toward the frame 1025 so as to limit the lever, as during the just described rightward movement thereof.

In the same manner as just described, the inward and outward movements of lockout bar 636 is limited respectively by knob 625 secured thereto and leaf spring 638, the latter also serving to prevent free sliding of the bar. At times when the clearing mechanism for dials 154 is in normal position and the bar is pushed in, it situates under flexible lever 610 (Fig. 4) of the mechanism. Thus the bar 636 prevents counter-clockwise movement of the lever 610, whereby the mechanism cannot perform a clearance operation. If the clearance actuating means is triggered while the bar 636 is in lockout position, the lever 591 (Fig. 8) yields with respect to the then stationary lever 593. Flexible lever 610 (Fig. 9) is also provided with an ear 637 to prevent the bar 636 from being moved over the lever while the lever is at a position other then normal which occurs only during a clearance operation of the clearing mechanism.

What I claim is:

1. In a machine having a register and mechanism operable to effect a numerical registration therein, a clearing device for zeroizing said register, a reciprocatory motivating means automotive for forward stroke operation only, said motivating means having a coupling engageable with said device for effecting operation of said device on said forward stroke of said motivating means, means cooperating with said coupling for effecting disengagement thereof from said device upon completion of said forward stroke, a manually operable initiatory control for initiating said automotive operation of said motivating means, and a reengaging means operable in response to and concurrently with said mechanism for returning said motivating means thereby to reengage said coupling with said device and to render said motivating means responsive again to said control at the completion of the current registration by said mechanism.

2. The invention according to claim 1, wherein said motivating means includes resilient means for effecting its forward stroke operation.

3. The combination of a register including at least one rotatable dial means bearing numerical indicia, a drive gear means individual to each dial means and engaged with said dial means for rotating said dial means, register operating mechanism for causing digital actuation of said register through said drive-gear means, lug means carried by each drive-gear means, clearing means comprising rockable arm means individual to each drive-gear means and mounted for rotation in unison, each arm means engaging its related lug means and moving the same for effecting turning of the related said dial means to cleared position, a motivating device mounted for pivotal movement between first and second positions and including biasing means operative to exert a moving bias on said motivating device in said first position to urge said motivating device to said second position, link means connecting said motivating device to said clearing means for moving said arm means thereof by said motivating device to effect said clearing, releasable key actuated detent means for holding said motivating device against said movement from said first position to said second position and being actuatable for releasing said motivating device for said movement to said second position, and a movably mounted stopping and restoring member means normally standing at said second position in the path of movement of said motivating device for blocking and arresting the same thereat, said member means being connected with said register operating mechanism for movement thereby to said first position for returning said motivating device to said biased first position and into holding engagement thereat with said detent means.

4. The combination of a plurality of multiorder registers; mechanism for causing digital actuation of said registers; a clearing means for each register for zeroizing said registers; an actuating device for each clearing means pivotally mounted for movement between first and second positions, each actuating device comprising biasing means operative thereon when in said first position for exerting moving bias for urging said actuating device to its said second position; link means connecting each actuating device to its related clearing means for moving said clearing means to zeroize its related register; releasable key actuated detent means for each actuating device normally holding said actuating device at said first position and being actuatable for releasing its related said actuating device for said movement to its said second position; selectively operable key means for each detent means for actuating said detent means, and a movably mounted stopping and restoring member means, normally standing at said second position in the path of movement of all said actuating devices for blocking and arresting each thereat, said member means being connected with said mechanism for movement thereby to said first position for returning any displaced actuating device to its first position into holding engagement with its related said detent means and under the influence of its said biasing means.

5. The combination of a plurality of multiorder registers, mechanism for effecting digital actuation of said registers, a clearing means for each register for zeroizing said registers; an actuating device for each clearing means mounted for movement between first and second positions, each actuating device comprising biasing means operative thereon when in said first position for exerting moving bias for urging said actuating device to its said second position, link means connecting each actuating device to its related clearing means for moving said clearing means to zeroize its related register, releasable key actuated detent means for each actuating device normally holding said actuating device at said first position and being actuatable for releasing its related said actuating device for said movement to its said second position, selectively operable key means for each detent means for actuating said detent means, and a movably mounted restoring means common to all said actuating devices and connected with said mechanism for movement thereby for engaging any displaced said actuating device and returning the same to its first position into holding engagement with its related said detent means and under the influence of its said biasing means.

6. In a calculating machine, a multiorder register; a transverse rod means mounted for rotary movement, ordinal clearing means mounted on said rod means for rotation therewith for zeroizing the respective orders of said register; pivoted means coupled with said rod means for rotating said rod means, a tensioned spring means connected to a fixed portion of said machine and to said pivoted means for restoring said pivoted means and therethrough all said clearing means following a zeroizing operation; a first lever means journaled on said pivoted means; a second lever means connected to said pivoted means for rotation therewith and resiliently constrained to move together with said first lever means, a third lever means mounted for rotation on said pivoted means; latch means pivotally carried on a distal end of said third lever means for movement therewith and releasably engaging said first lever means for rotation of said first lever means upon rotation of said third lever means; disengaging means in the path of movement of said latch means for rocking said latch means from engagement with said first lever means when said pivoted means has been rotated sufficiently to effect said zeroizing, whereupon said pivoted means is free to be restored by said tensioned spring means; pivoted actuating lever means; loaded spring means for rotating said actuating lever means; a link connecting said actuating lever means and said third lever means for rotating the latter upon rotation of said actuating lever means; rockable detent means engaging said actuating lever means for normally holding said actuating lever means against the influence of said loaded spring means; clearing key means for rocking said detent means for disengaging said detent means from said actuating lever means to permit rotation thereof by said loaded spring means; return lever means pivoted coaxially with said actuating lever means and normally standing at a stop position in the path of said actuating lever means for arresting said actuating lever means, said return lever means being rotatable for rotating back said actuating lever means to reload said spring means, re-engage said actuating lever means with said detent means and relatch said latch means with said first lever means, and main operating means operative during a computing operation for effecting digital setting of said register and coupled with said return lever means for rotating said return lever means during said computing operation.

7. In a calculating machine, a multiorder register; a transverse rod means mounted for rotary movement, ordinal clearing means mounted on said rod means for rotation therewith for zeroizing the respective orders of said register; pivoted means coupled with said rod means for rotating said rod means, tensioned spring means connected to a stationary portion of said machine and to said pivoted means for restoring said pivoted means and therethrough all said clearing means following a zeroizing operation; a first lever means journaled on said pivoted means; a second lever means connected to said pivoted means for rotation therewith, and spring means between said first and second lever means for constraining said second lever means to move together with said first lever means, a third lever means mounted for rotation on said pivoted means; latch means pivotally carried on a distal end of said third lever means for movement therewith and releasably engaging said first lever means for rotation of said first lever means upon rotation of said third lever means; disengaging means in the path of movement of said latch means for rocking said latch means from engagement with said first lever means when said pivoted means has been rotated sufficiently to effect said zeroizing, whereupon said pivoted means is free to be restored by said tensioned spring; pivoted actuating lever means rotatable from a first position to a second position; loaded spring means for rotating said actuating lever means from said first position to said second position; a link connecting said actuating lever means and said third lever means for rotating the latter upon rotation of said actuating lever means; rockable detent means engaging said actuating lever means for normally holding said actuating lever means at said first position against the influence of said loaded spring means; clearing key means for rocking said detent means for disengaging said detent means from said actuating lever means to permit rotation thereof by said loaded spring means; pivoted return lever means rotatable for restoring said actuating lever means to reload said spring means, re-engage said actuating lever means with said detent means and relatch said latch means with said first lever means, and main operating means operative during a computing operation for effecting digital setting of said register and coupled with said return lever means for rotating said return lever means during said computing operation.

8. The construction according to claim 7 and comprising a stopping lever means carried by said rod means for rotation therewith, and zeroizing lockout key means optionally movable into the path of said stopping lever means for blocking rotary movement of said stopping lever and therethrough of said clearing means, thereby to prevent inadvertent clearing of said register in response to accidental manipulation of said clearing key means.

9. The combination according to claim 7 and comprising a carriage movably supported in said machine for transverse shifting therein, said register, said rod means and said clearing means being supported by said carriage for said shifting movement therewith, said pivoted means comprising a gear segment connected to said rod means, and an axially elongated gear means rotatably supported on a stationary portion of said machine and extending longitudinally along said carriage for being in continuous meshing engagement with said gear segment for rotating said gear segment at all positions of said carriage and during shifting thereof, said first, second and third lever means being mounted on said elongated gear means of said pivoted means.

10. The combination of a multiorder register including a pivoted numeral bearing dial means in each order, a drive gear means individual to each dial means and engaging said dial means for rotating said dial means, a plurality of lug means carried by each drive gear means, said lug means being mutually spaced equi-angularly and equi-radially relative to the axis of its drive gear means, and the angular interspace between adjacent lug means being proportional on a predetermined reduced scale to rotation of the related dial means completely through the series of numerals thereon, register operating mechanism for causing digital actuation of said register through said drive gear means, a clearing device comprising rockable arm means individual to each drive gear means and mounted for common rotation, each arm means being formed with intersecting lug engaging faces on an outer portion thereof for entering between adjacent lug means for contact by one of said faces with one of said adjacent lug means, when the related dial means stands at any numeral position other than zero position, to move said drive gear means and the related dial means until the other of said adjacent lug means contacts the other of said faces whereupon said dial stands at zero, a motivating device mounted for pivotal movement between first and second positions and comprising biasing means for urging said motivating device from said first position to said second position, link means connecting said motivating device to said clearing device for moving said arm means thereof by said motivating device to effect said zeroizing, releasable key actuated detent means for normally engaging and latching said motivating device at said first position and being actuatable for releasing said motivating device for said movement to said second position, and movably mounted means connected with said register operating mechanism for movement thereby for engaging and restoring said motivating device from said second position to said first position to reenergize said biasing means and reestablish latching engagement between said motivating device and said detent means.

11. The combination of a register, register operating mechanism for causing digital actuation of said register, a clearing means for zeroizing said register, an actuating device mounted for movement between first and second positions and comprising normally energized biasing means operative to move said actuating device from said first position to said second position, link means connecting said actuating device to said clearing means for actuating said clearing means to zeroize said register, a detent for normally engaging and latching said actuating device at said first position, a clear key for directly engaging said detent for moving said detent to release said actuating device for said movement to said second position, and a movably mounted member normally located at said second position in the path of movement of said actuating device for engaging and arresting said actuating device at said second position, said member being connected to said register operating mechanism for movement thereby to said first position for restoring said actuating device from said second position to said first position to reenergize said biasing means and to relatch said actuating device by said detent.

12. The combination of a register, register operating mechanism for causing digital actuation of said register, a clearing device for zeroizing said register, an actuating device pivotally mounted for movement from a first position to a second position and connected to said clearing device for actuating said clearing device, said actuating device comprising normally energized biasing means operative on said actuating device in said first position for exerting moving bias to urge said actuating device to said second position to zeroize said register, a pivoted detent engaging said actuating device for normally latching said actuating device at said first position, a clear key contacting said detent for rocking said detent to release said actuating device for said movement to its said second position, a restoring member mounted for movement between said first and second positions of said actuating device and normally located at said second position for engaging and arresting said actuating device at said second position, said restoring member being connected to said register operating mechanism for movement thereby from said second position to said first position for restoring said actuating device from said second position to said first position to reenergize said biasing means and to relatch said actuating device by said detent.

13. The combination of a register, a clearing device for zeroizing said register, a motivating means mounted for movement between a normal first position and a second position and connected to said clearing device for actuating said clearing device, said motivating means comprising normally energized biasing means operative to urge said motivating means from said first position to said second position, a pivoted detent means engaging said motivating means for normally latching said motivating means in normal position, a clear key directly engaging said detent means and operable for disengaging said detent means from said motivating means, a restoring member mounted for movement between said first and second positions of said motivating means for returning said motivating means to normal position, said restoring member being normally located at said second position, a single cycle register operating mechanism for causing digital actuation of said register, said operating mechanism comprising a rotatable cam means, said cam means comprising a dwell face portion of substantial radial elevation and extending for a substantial proportion of the cycle of revolution of said cam means, a spring biased pivoted cam follower continuously contacting said cam means, said follower being rocked by said cam means from a normal position to operated position at the beginning of said cycle, said follower being held at said operated position by said dwell face portion and being restored to said normal position at the end of said cycle, and link means connecting said cam follower to said restoring member, whereby said cam and follower operate said restoring member for restoring said motivating means to normal position to reenergize said biasing means and relatch said motivating means by said detent means, said restoring member holding said motivating means in normal position during a substantial portion of the cycle to prevent movement of said motivating means to second position in response to release of said detent means during digital actuation of said register.

14. A register including a rotatable numeral wheel having a series of equispaced indicia "0" and "1" to "9" on the periphery thereof and a pinion connected thereto, gear means engaging said pinion for rotation thereby, a pivoted shaft, a unitary lever carried by said pivoted shaft for bodily rotation in a circular path about the axis of said shaft, first and second lug engaging faces on a distal end of said lever, and a plurality of equi-angularly and equi-radially spaced lugs on said gear means, each lug being formed with first and second oppositely oriented lever engaging faces and carried by said gear means for rotation therewith so that a lug is moved into said path of said lever whenever said numeral wheel stands at any position one to nine, for positive movement directly by said lever upon rotation of said shaft, said first lug engaging face on said lever contacting said first lever engaging face on a said lug to effect rotation of said numeral wheel in one direction from any one of certain of said angular positions all the way to zero position, and said second lug engaging face on said lever contacting said second lever engaging face on a said lug to effect rotation of said numeral wheel in the opposite direction from any one of all of others of said angular positions all the way to zero position.

15. In a calculating machine, a register having a plurality of individually rotatable dials, each bearing a single series of number indicia, a first gear means carried by each dial for rotation therewith, a plurality of second gear means, one for each first gear means and meshed therewith for rotating the same, dial actuating means engageable with said second gear means for rotating said second gear means in a predetermined normal direction to effect digital actuation of the related said dial, a plurality of equi-angularly and equi-radially spaced lugs carried by each second gear means for rotation therewith, the angular interspace between adjacent lugs being proportional on a predetermined reduced scale to rotation of the related dial completely through the series of indicia thereon, a journaled shaft, a zeroizing lever individual to each second gear means carried on said shaft for rotation therewith and having first and second lug engaging intersecting faces on a distal end portion thereof for interposing contact between and with adjacent lugs, said first face contacting with one of said lugs, when the related dial exhibits any of certain of said numerals other than zero, and moving the contacted lug in said normal direction until the adjacent lug contacts said second face whereupon said dial exhibits zero, and said second face contacting with one of said lugs, when said dial exhibits any of others of said numerals other than zero, and moving the contacted lug opposite said normal direction until the adjacent lug contacts said first face, whereat said dial exhibits zero.

References Cited in the file of this patent

UNITED STATES PATENTS 670,075 Heinitz ---------------- Mar. 19, 1901

(Other references on following page)

UNITED STATES PATENTS

| | | |
|---|---|---|
| 859,410 | Rath | July 9, 1907 |
| 1,298,250 | Noonan | Mar. 25, 1919 |
| 1,357,747 | Turck | Nov. 2, 1920 |
| 1,357,748 | Turck | Nov. 2, 1920 |
| 2,036,901 | Walter | Apr. 7, 1936 |
| 2,211,736 | Avery | Aug. 13, 1940 |
| 2,229,895 | Lothrop | Jan. 28, 1941 |
| 2,343,241 | Moody | Mar. 7, 1944 |
| 2,365,325 | Avery | Dec. 19, 1944 |
| 2,377,767 | Dustin | June 5, 1945 |
| 2,531,207 | Gang | Nov. 21, 1950 |
| 2,554,103 | Grip | May 22, 1951 |
| 2,636,677 | Gang | Apr. 28, 1953 |

FOREIGN PATENTS

| | | |
|---|---|---|
| 381,007 | France | Oct. 20, 1907 |
| 555,936 | France | Apr. 4, 1923 |
| 568,933 | Germany | Jan. 26, 1933 |